W. S. LOBDELL.
HAND TRUCK.
APPLICATION FILED MAY 7, 1917.
1,296,675.
Patented Mar. 11, 1919.
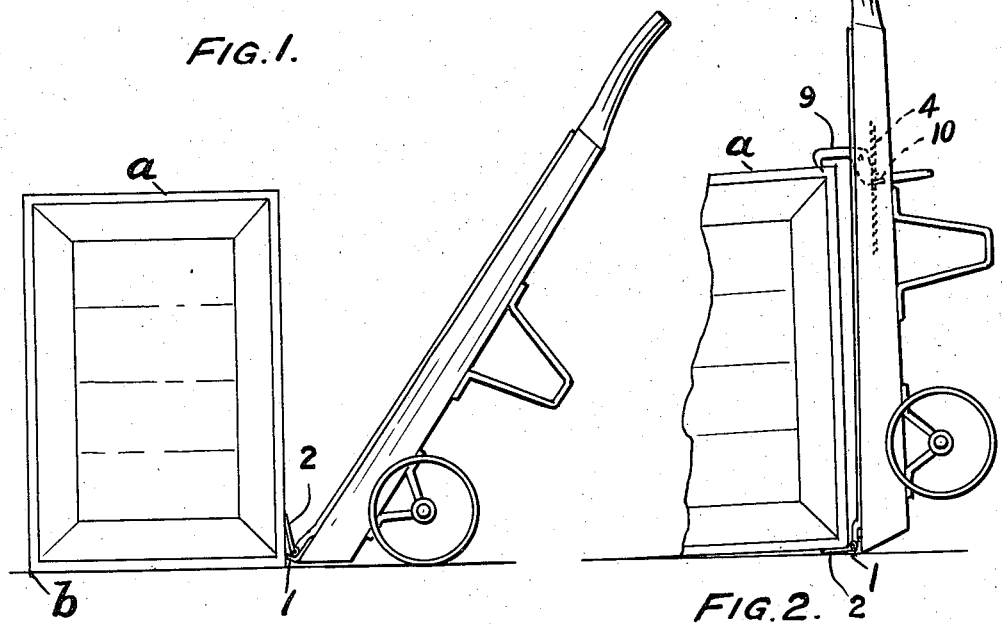
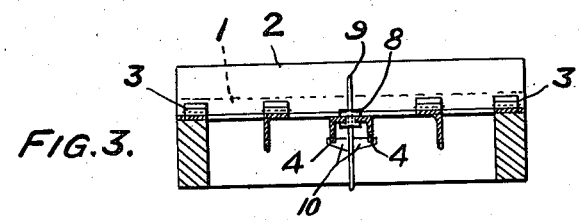
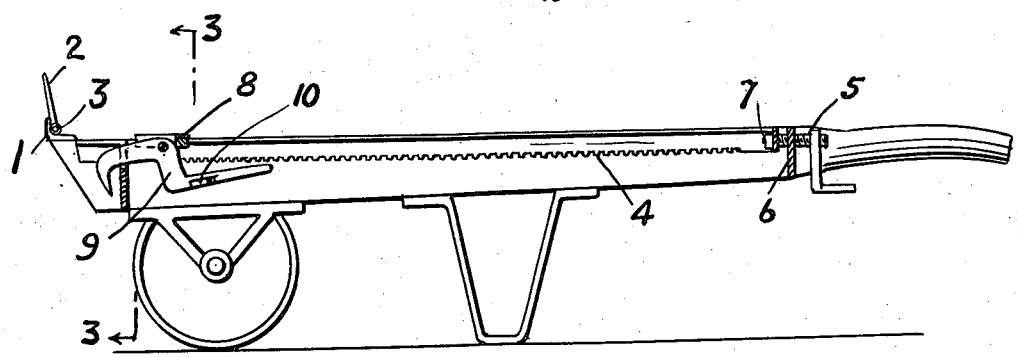
WITNESS:
Rob't R. Kitchel
INVENTOR
Wilbur S. Lobdell
BY
Augustus B. Stoughton
ATTORNEY

UNITED STATES PATENT OFFICE.

WILBUR S. LOBDELL, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

HAND-TRUCK.

1,296,675.  Specification of Letters Patent.  Patented Mar. 11, 1919.

Application filed May 7, 1917. Serial No. 166,893.

*To all whom it may concern:*

Be it known that I, WILBUR S. LOBDELL, a citizen of the United States, residing at Philadelphia, in the county of Philadelphia and State of Pennsylvania, have invented certain new and useful Improvements in Hand-Trucks, of which the following is a specification.

The principal object of the present invention is to facilitate the movement of boxes, crates and the like by means of hand trucks, and this object is attained by the improvements in trucks to be finally claimed, but first described in connection with the accompanying drawings in which—

Figure 1, is a side view of a truck embodying features of the invention, showing also the lifting tongue in position to fall by gravity under a case as soon as it is lifted.

Fig. 2, is a similar view showing the crate and truck in connected relation.

Fig. 3, is a transverse sectional view taken on the line 3—3, of Fig. 4, and

Fig. 4, is a longitudinal section of the truck.

In the drawings 1, is a limiting stop at or near the end of the truck. 2, is a lifting tongue pivoted as at 3, at or near the end of the truck and freely movable between the stop and the face of the truck. 4, is a rack- or ratchet-bar, endwise movable, for a short distance, say several inches, of the truck. 5, is a screw device for shifting the rack bar. As shown the fixed element 6, is the nut, and the connection 7, permits of turning movement of the elements which it connects. 8, is a carriage freely slidable in respect to the rack-bar. 9, is a claw pivoted to the carriage and balanced for automatic engagement of its pawl-part 10, with the rack.

In use the end of the truck is run up close to the crate *a*, with the lifting tongue 2, resting freely against one of the side walls of the crate, as shown in Fig. 1. Then the crate *a*, is turned up slightly on its edge *b*, as a fulcrum, so that the tongue 2, falls by gravity against its stop and under the crate, and when the crate is released it falls back on top of the tongue. Evidently in this way, one man can readily, quickly and comparatively easily get the crate, even though it be heavy, on top of the tongue. Thereupon the truck is turned up into the position shown in Fig. 2, and the claw 12, having been brought into approximate position by sliding the carriage 8, along the rack-bar 4, is made to engage the crate by a few turns of the screw device 5. This operation can be performed promptly and with little labor. Then the truck and crate can be wheeled away and afterward unloaded by releasing the screw device. When the carriage is positioned along the rack bar, and the truck is turned up, the claw swings by gravity into position for engaging the rack; it being understood that the righthand end of the claw in Fig. 4, is heavier than the lefthand end thereof, so that the action of the claw in this respect is automatic. The lifting tongue 2, extends clear across the truck so that the latter will operate in the manner described in connection with packages of any width and will operate with certainty without requiring special care in the placing of the truck with respect to the packages. The stop 1, is short in the sense that it is a stop and nothing more and plays no part in the lifting by direct contact with the packages.

What I claim is:

In a hand truck the combination of a lifting tongue at one end of the truck, a rack bar movable endwise of the truck, a screw device for shifting the rack-bar, a carriage slidable in respect to the rack-bar, and a claw pivoted to the carriage and balanced for automatic engagement with the rack-bar when the truck is in operative position, substantially as described.

WILBUR S. LOBDELL.